INVENTOR
JOHN F. FALL
BY
ATTORNEYS

INVENTOR
JOHN F. FALL

INVENTOR
JOHN F. FALL

BY

ATTORNEYS

United States Patent Office 3,442,500
Patented May 6, 1969

3,442,500
APPARATUS FOR DEVELOPING BRANCH PIPE
CONNECTIONS
John F. Fall, New Paltz, N.Y., assignor to Aljen Corporation, Ambler, Pa., a corporation of Pennsylvania
Filed Apr. 11, 1967, Ser. No. 630,123
Int. Cl. B23k 5/24, 7/10; B43l 11/00
U.S. Cl. 266—23                                       2 Claims

ABSTRACT OF THE DISCLOSURE

A pipe is rotated adjacent a cutting tool such as a cutting torch mounted for movement parallel to the pipe with the rotating mechanism actuating a structure which delivers its output to move the torch to develop together with the rotation of the pipe the desired contour at the end of the pipe.

Background of the invention

It is well known to employ automatic machines to provide the desired contour on the end of a pipe which is to be joined to another pipe. The prior art machines, however, are extremely complex in construction and, hence, costly to build and to maintain.

All prior machines are based on two basic mechanisms:

A. A straight miter mechanism. This develops a sine curve with an amplitude equal to the diameter of the branch multiplied by the tangent of the angle from the perpendicular, and is developed by various means.

B. A developing mechanism for a 90 degree intersection between two pipes. This consists of a crank set to the diameter of the branch, a radius arm set to the diameter of the header, and means for converting radial to lateral and back to radial and lateral motions. It follows the radial contour of the header only, and is good for only 90 degree intersections.

To obtain the contour of a branch intersecting a header at any angle other than 90 degrees it is then necessary to multiply the motion of the developing mechanism of "B" above by the cosecant of the intersecting angle, and *add* this to the resultant of the straight miter mechanism of "A" above set for the same angle. It is this multiplication and addition that contributes to the complication and loss of accuracy in the machine.

Where the radius or diameter of a pipe is referred to herein it is intended to mean either inner or outer radius or diameter since both the inner and outer radius or diameter are frequently used the choice depending on the preference of the user of the machine.

Summary of the invention

The apparatus of the invention is provided with rotatable arm means for tracing a circle of the radius of the selected branch pipe. The apparatus employs a lever pivoted on an axis lying in a plane parallel to the axis of the rotatable means. The axis on which the lever is pivoted can be swung in the aforementioned plane to position the lever axis at an angle with respect to the axis of the rotatable means equal to the angle of intersection of the selected branch and header pipes. Further, the axis on which the lever is pivoted lies in a common plane with the axis of the rotatable means provided the branch pipe is not offset from the center of the header pipe. If it is offset, the apparatus provides for positioning the axis on which the lever is pivoted to the appropriate side of the axis of the rotatable means at a distance from said axis equal to the distance of offset of the branch pipe. The component of motion of the rotatable means in the direction of movement of the lever is transferred to the lever at a point removed from the previously mentioned pivot point of the lever at a distance equal to the radius of the header pipe to provide for the movement of this point on the lever with respect to the axis of the lever pivot point through an arc having the radius of the header pipe. The branch pipe is held and rotated at the same angular rate as the rotatable arm means is rotated. Cutting means are mounted for movement parallel to the branch pipe axis. The component of movement of the lever in the direction of the axis of the rotatable arm means is transferred to the cutting means.

It will be appreciated that the apparatus of the invention by simulating the contours of the branch and header pipes, any angle of intersection between them and any offset of the branch pipe from the header pipe eliminates the complexities of the prior art machines as discussed above. In particular, providing means to swing the axis on which the lever is pivoted to position this axis at an angle to the axis of the rotating means equal to the angle of intersection of the branch and header pipes eliminates the multiplying and addition functions heretofore necessary as discussed above.

Preferred embodiment

Figures 1, 2, 3:
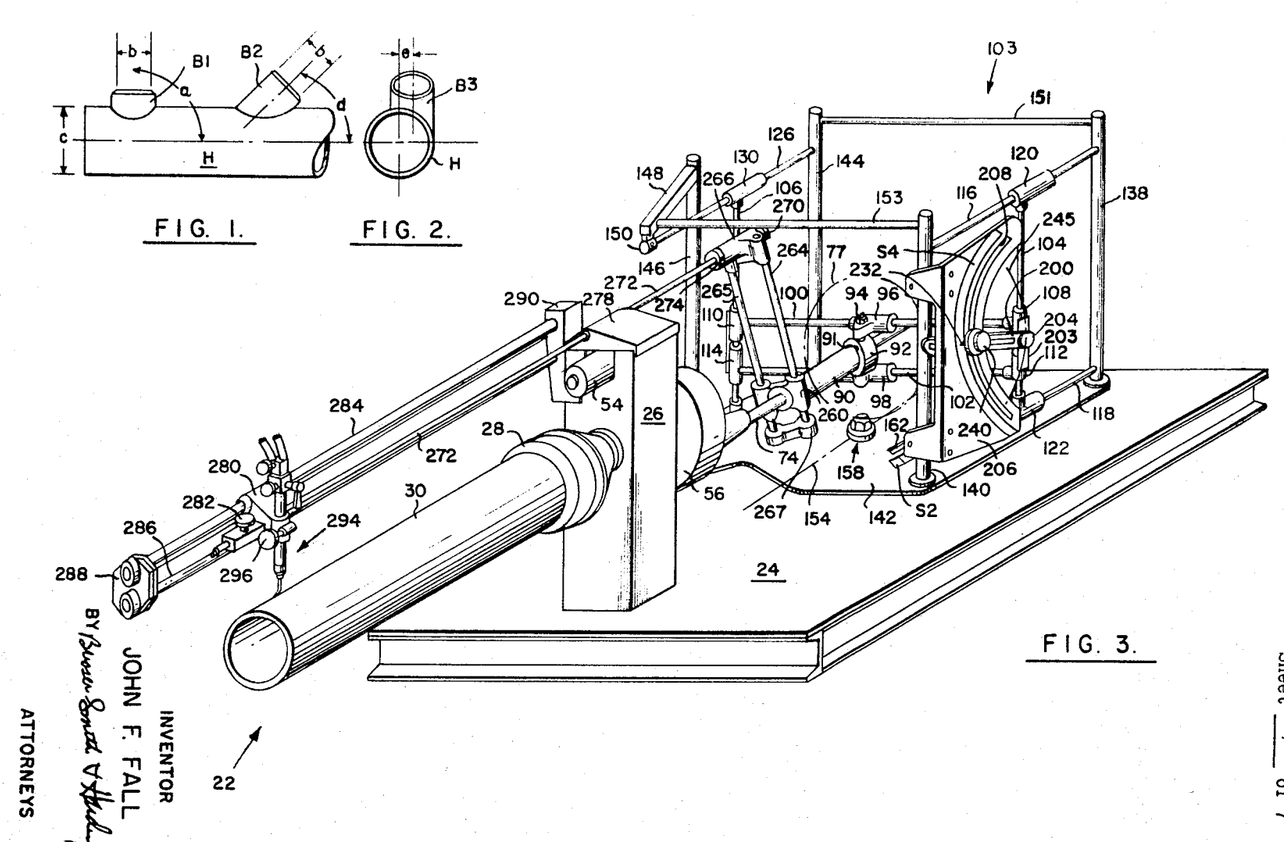
FIGURE 1 is a schematic view of intersecting pipes.
FIGURE 2 is a schematic view of a pair of intersecting pipes.
FIGURE 3 is a front perspective view of an apparatus in accordance with the invention.

The purpose of the preferred embodiment as well as of other embodiments of the invention is to properly develop the contour of the end of a branch pipe so as to match up with an opening in a header pipe for welding thereto. Referring to FIGURE 1, a simple case is where a branch $B_1$ is to be joined to header H with the axis of the branch $B_1$ being normal to the axis of the header H, that is to say, where the angle $a$ is equal to 90°. In such case the only dimensions required by pipe cutting apparatus are the radius of branch $B_1$ ($b/2$) and the radius of header H ($c/2$). If the angle $a$ can be varied as is generally the requirement for pipe cutting apparatus to, for example, a different angle $d$ as is illustrated with respect to the branch $B_2$ then the cutting apparatus must be capable of taking care of this variation which is generally referred to as the angle of intersection.

Finally with reference to FIGURE 2, it will be seen that it may be desired to connect a branch pipe $B_3$ to header H with the axis of branch $B_3$ offset from the axis of header H by an amount $e$. A cutting apparatus must be adjustable to take care of this variation which is known as right or left offset of center. The preferred embodiment to be described is capable of being adjusted to take care of all of these possible variations as will be understood from the following description.

Figure 5:
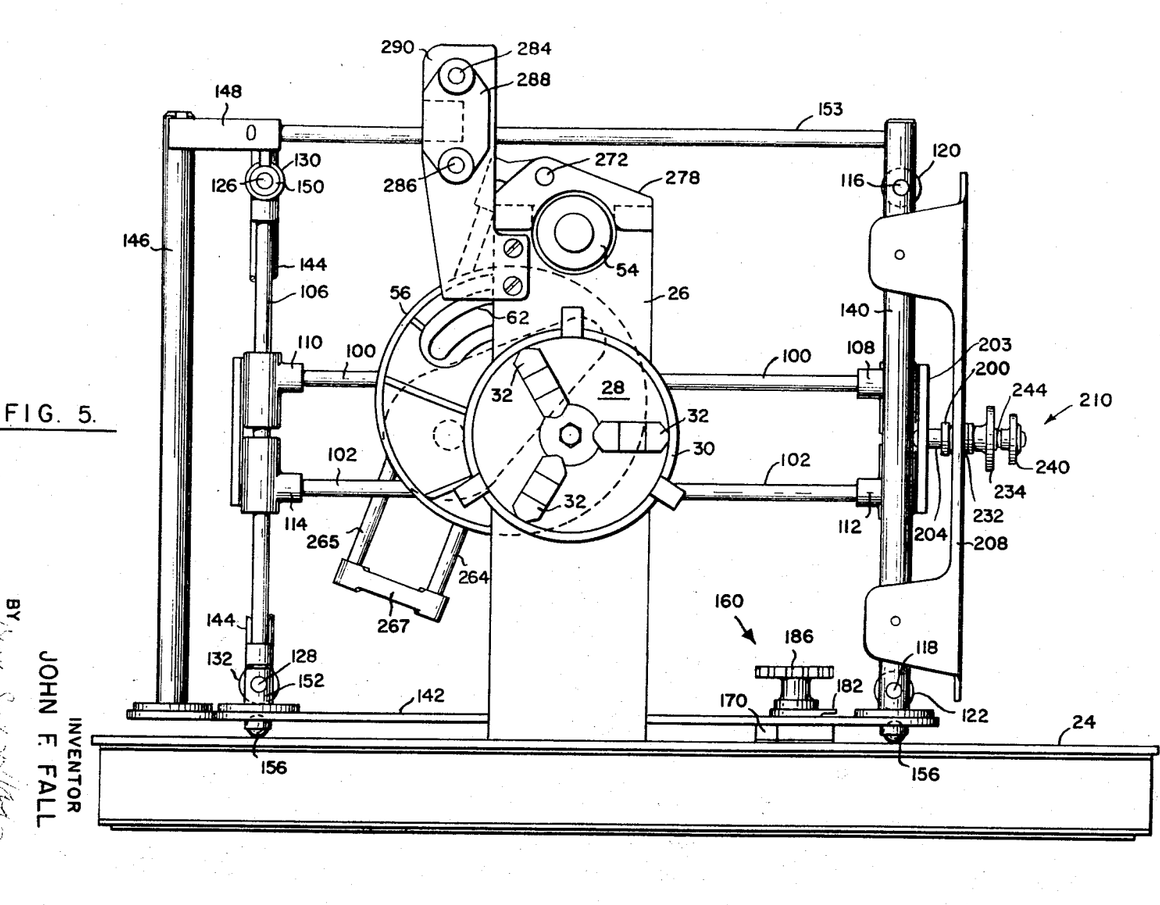
FIGURE 5 is a front elevation of the apparatus of FIGURE 3.
Figure 8:
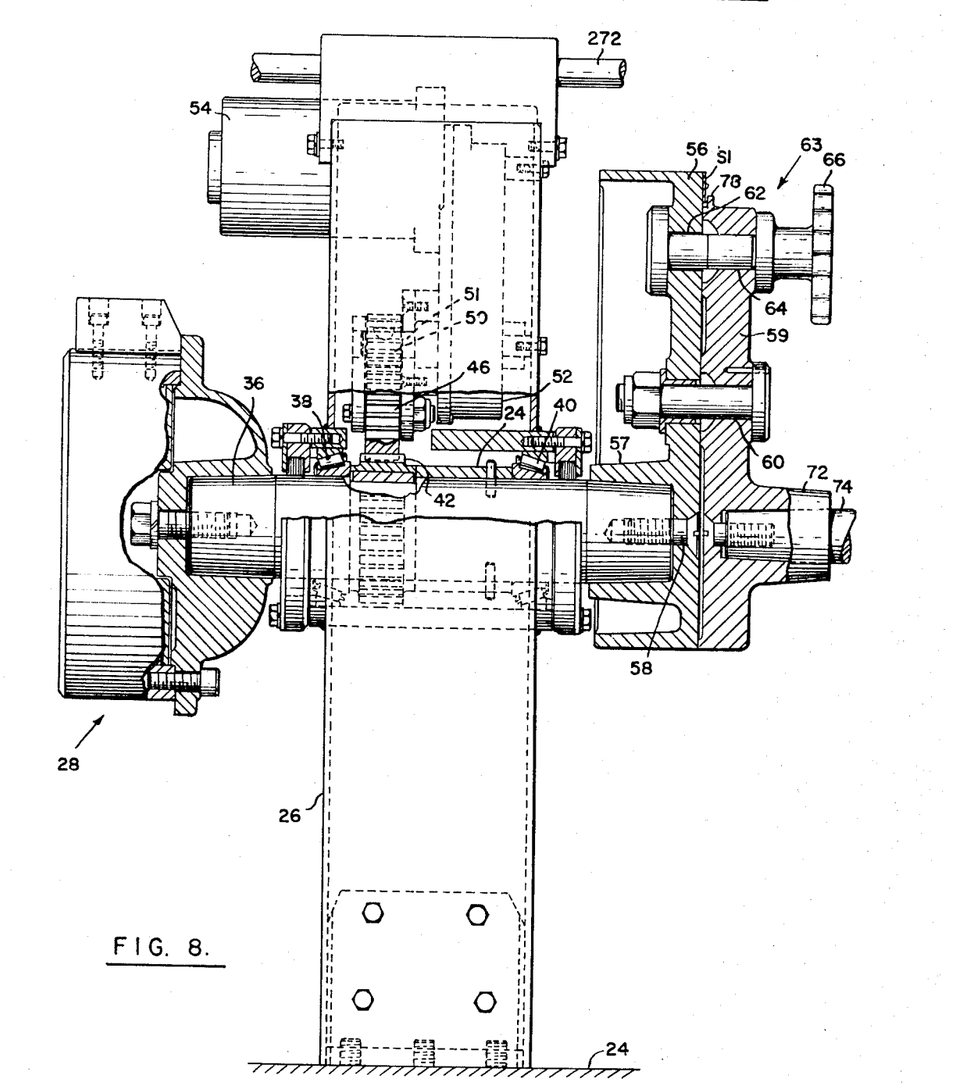
FIGURE 8 is an elevational view, partially broken away, showing a portion of the drive mechanism of the apparatus of FIGURE 3 with the branch size set to zero.

Referring first to FIGURE 3, a pipe cutting apparatus 22 is mounted on a platform 24 supporting a housing 26. A conventional chuck 28 mounts a branch pipe 30 for rotation. As best seen in FIGURE 5, chuck 28 is provided with three conventional pipe engaging jaws 32. Referring now to FIGURE 8, chuck 28 is mounted on a shaft 36 mounted for rotation on tapered roller bearings 38 and 40. A ring gear 42 mounted on shaft 36 engages a gear 46 which, in turn, engages a gear 50. Gear 50 is driven by output shaft 51 of a reduction gear drive indicated at 52 which, in turn, is driven by an electric motor 54. The chuck 28 and the manner of rotating it are quite conventional.

As seen in FIGURE 8, shaft 36 is also fixedly secured to disc 56 in hub 57 thereof by means of a taper fit and machine screw 58. As seen in FIGURE 8, an arm 59 is pivotally secured as indicated at 60 to disc 56. Disc 56 has an arcuate slot 62 concentric with pivot point 60 through which passes a headed and threaded clamp member 63 which passes through opening 64 in arm 59 and has threadably secured thereto a clamping member 66. Arm 59 has a hub 72 in which is fixedly secured a rod 74. Disc 56 is provided with a scale $S_1$ having graduations 76 reading from 0" to 12½". A pointer 78 on the end of arm 59 cooperates with scale $S_1$ to provide for the offsetting of rod 74 from the axis of shaft 36 an amount equal to the radius of the branch pipe being cut. The construction of the scale will be gone into in greater detail later. Thus the rod 74 traces a circle indicated at 77 (FIGURE 3) having a radius equal to the radius of the branch pipe.

Figure 9:
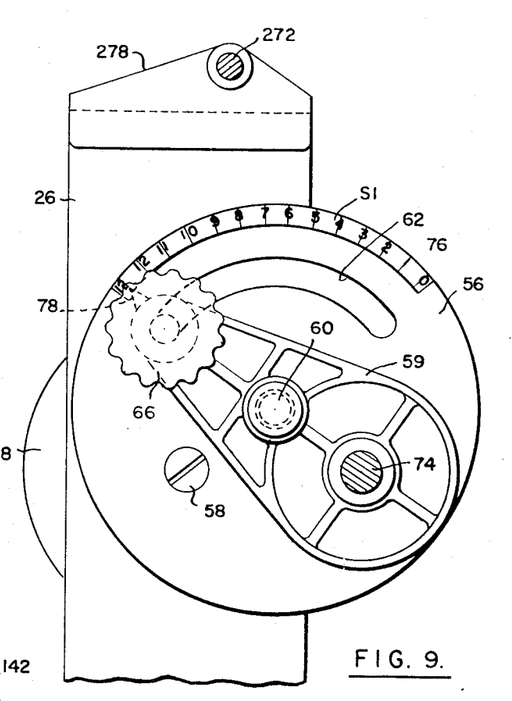
FIGURE 9 is a rear elevational view, partially broken away, showing the mechanism for offsetting the rotated arm of the apparatus of FIGURE 3.

As seen in FIGURE 8, arm 59 is positioned with rod 74 coaxial with shaft 36 which is the zero dimension position of arm 59. As shown in FIGURE 9, arm 59 is positioned for the maximum size branch pipe, i.e., one having a diameter of 12½". While it will be obvious that the cutting apparatus of the invention can be designed for a wide variety of sizes of headers and branches, the preferred embodiment here is illustrated for handling branches having diameters of up to 12½" and headers having diameters of up to 24".

Figure 6:
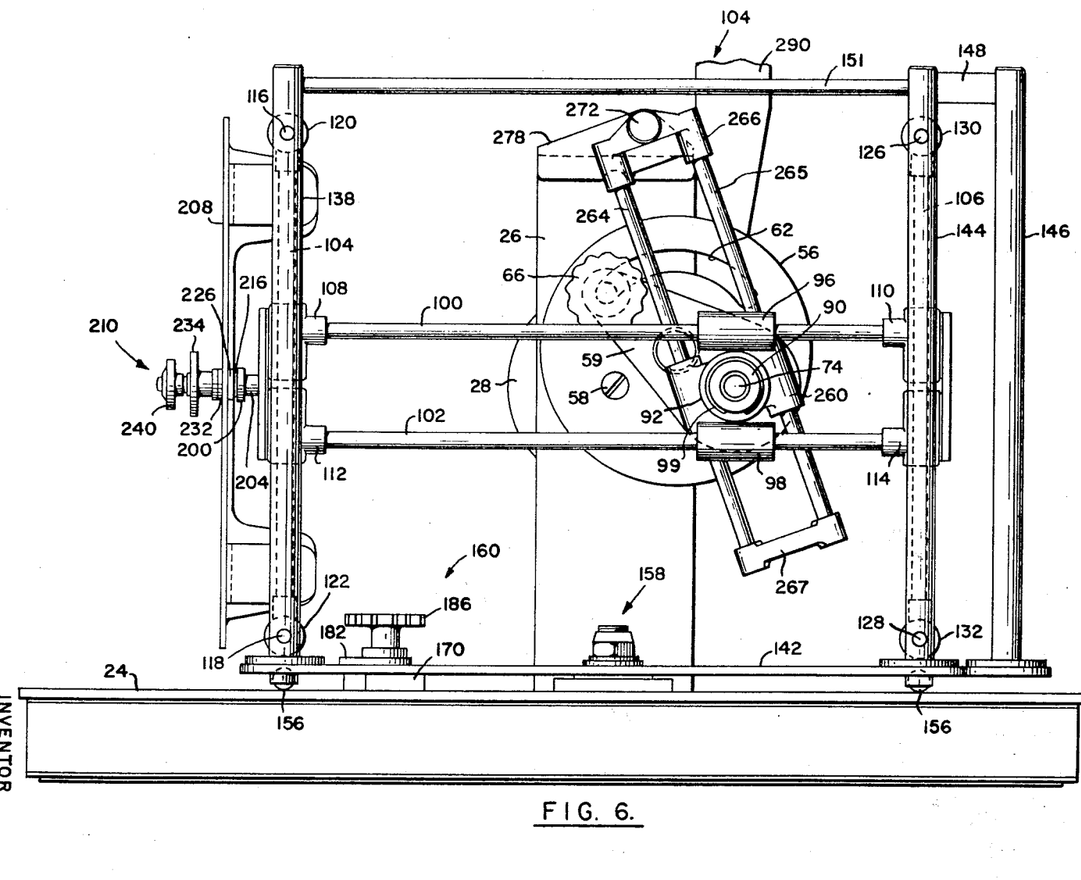
FIGURE 6 is a rear elevation of the apparatus of FIGURE 3.
Figures 7, 7A, 7B, 7C:
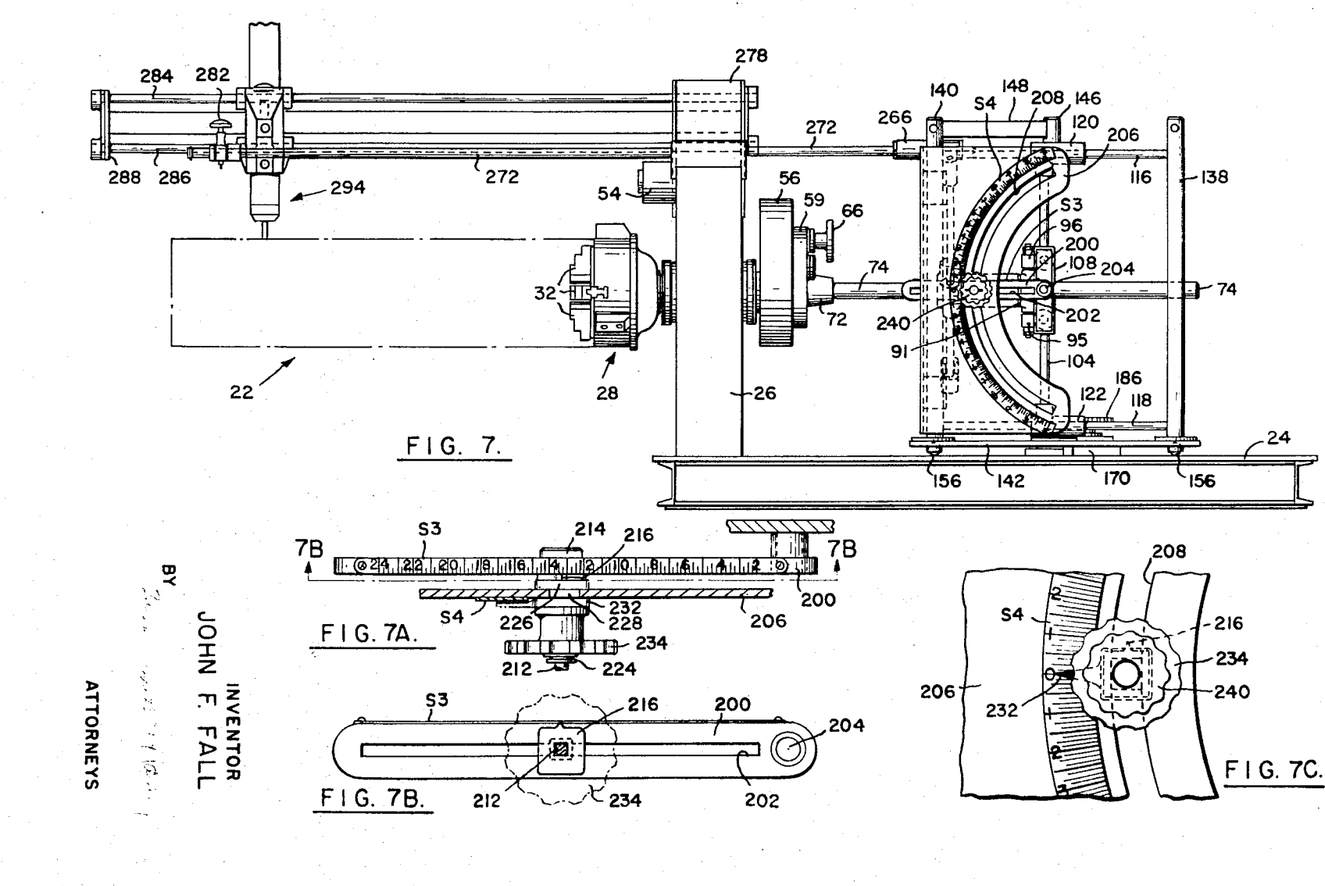
FIGURE 7 is a side elevation of the apparatus of FIGURE 3.
FIGURE 7A is a plan view, broken away, of a scale.
FIGURE 7B is a section on line 7B—7B in FIGURE 7A.
FIGURE 7C is an elevation, broken away, of a scale.

Referring now to FIGURE 3, rod 74 passes through a sleeve 90, the rod and sleeve being free to move axially and rotatably relative to each other. Sleeve 90 has a shoulder 91 (FIGURE 7) which abuts against a collar 92 which, in turn, is pivotally connected on a vertical axis as indicated at 94 to a slider 96 and similarly connected at 95 to a slider 98 (FIGURE 7). Sleeve 90 is free to oscillate inside collar 92 being secured to the collar by a snap ring 99 (FIGURE 6). Sliders 96 and 98 respectively slidably engage transverse rails 100 and 102 of a cage 103. Rail 100 is connected to vertical rails 104 and 106 respectively for vertical sliding by sliders 108 and 110. Similarly rail 102 is connected to vertical rails 104 and 106 for vertical sliding by sliders 112 and 114. Rail 104 is slidably connected to horizontal rail 116 and 118 by sliders 120 and 122 respectively. Similarly vertical rail 106 is slidably connected to horizontal rails 126 and 128 by sliders 130 and 132 respectively (FIGURE 5). Rails 116 and 118 are fixedly secured to standards 138 and 140 fixedly secured to cage base plate 142 (FIGURE 3). Similarly rails 126 and 128 are fixedly secured to standard 144 mounted on base plate 142. Standard 146 (FIGURE 5) secured to base plate 142 supports a bar 148 which carries a collar 150 which is fixedly secured to rail 126. Rail 128 is fixedly secured in a short standard 152 mounted on base plate 142 as best seen in FIGURE 5. Standards 138 and 144 are connected by a rod 151 and standard 140 and bar 148 are connected by a rod 153.

Figures 4, 4A:
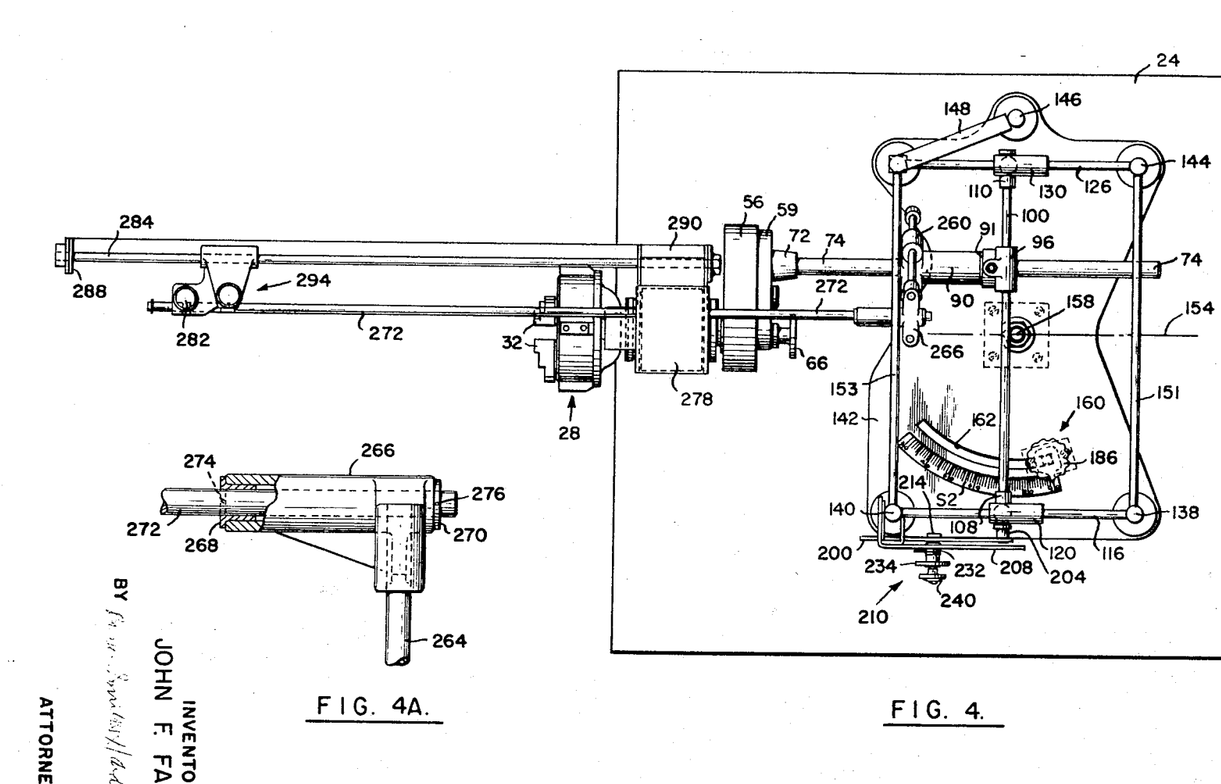
FIGURE 4 is a plan view of the apparatus of FIGURE 3.
FIGURE 4A is an enlarged view of a sleeve member holding a torch bar of the apparatus of FIGURE 4.

Plate 142 is mounted on a plurality of ball coasters 156 (FIGURES 5 and 6) which rest on platform 24. Base plate 142 is pivotally mounted as indicated at 158 and is secured in position by means of a clamp 160 which passes through an arcuate slot 162 concentric with pivot point 158 (FIGURE 4). A scale $S_2$ adjacent slot 162 is calibrated to be set to the angle of intersection between the branch and header.

Figure 10:
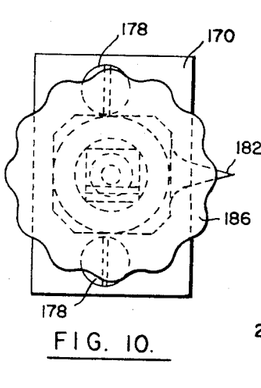
FIGURE 10 is an enlarged rear view of a clamp employed with the structure of FIGURE 3.
Figure 11:
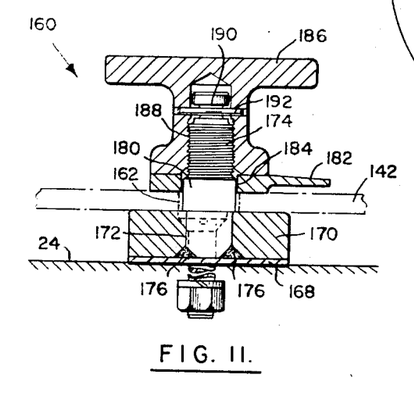
FIGURE 11 is a vertical sectional view of the clamp of FIGURE 10.

As best seen in FIGURES 10 and 11, clamp 160 comprises a base plate 168 resting on platform 24 and underlying a base block 170 having an opening 172 for the reception of a bolt 174 which is welded to block 170 as indicated at 176. Block 170 and plate 168 are secured to platform 24 by machine screws 178. Bolt 174 has a squared portion 180 which slidably engaged slot 162 in cage base plate 142 and which carries a pointer 182 having a square opening 184 to snugly engage squared portion 180 of bolt 174. A clamp member 186 is threadably secured as indicated at 188 to bolt 174 and is adapted to clamp pointer 182 and block 170 tightly together to stop movement of plate 142. Bolt 174 has a reduced portion 190 engaged by a horizontal pin 192 to limit the upward travel of clamp member 186 to prevent its inadvertent removal.

Horizontal motion is imparted to rails 100 and 102 by means of an arm 200 (see FIGURE 7) having a slot 202. Arm 200 is pivotally secured at 204 to a plate 203 which is fixedly secured to sliders 108 and 112 (FIGURE 3). Arm 200 is provided with a scale $S_3$ graduated to correspond to the diameter of the branch pipe in inches.

Arm 200 cooperates with a sector 206 secured to standard 140 and having a slotted portion 208 and an adjacent scale $S_4$ which is graduated from zero of the center in each direction for the inches of right or left offset of the branch pipe from the header pipe (FIGURE 7).

In operation, the settings of arm 200 and sector 206 are adjusted using a clamp 210 (FIGURES 12 and 13) having a bolt 212 provided with a headed member 214 which is adapted to bear against one side of arm 200. A pointer member 216 bears against the other side of arm 200 and has a squared hub opening 218 engaging a squared bolt portion 220 to prevent rotation of pointer member 216. The outer surface 217 is square in cross section to slidably and non-rotationally engage slot 202 in arm 200.

Figure 12:
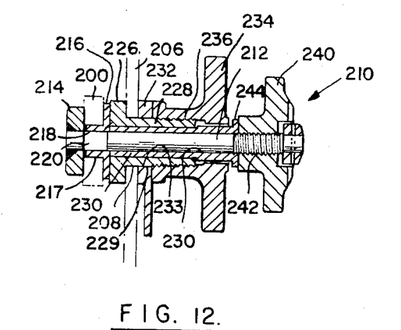
FIGURE 12 is a vertical section through a clamp employed with the intersecting arm of the apparatus of FIGURE 3.
Figure 13:
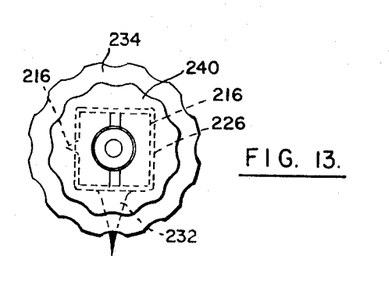
FIGURE 13 in an elevational view of the clamp of FIGURE 12.

A flange 226 bears against one side of sector 208 and is integral with a tubular member 228 which has an outer surface 229 which is square in cross section and non-rotatably and slidably engages sector slot 208. A sleeve 230 is interposed between member 228 and bolt 212 and abuts member 216. A pointer member 232 is keyed to member 228 by a square opening 233 for non-rotation and abuts against sector 208. A clamp member 234 is threadably secured to threaded portion 236 of member 228 to clamp sector 208 between flange 226 and pointer member 232.

A clamp member 240 is threadably secured at 242 to bolt 212 abutting against flange 244 of sleeve 230 in order to draw bolt head 214 towards sleeve 230 to clamp arm 200 between head 214 and pointer member 216. It will be noted that arm 200 is free to pivot about bolt 212 since sleeve 230 can rotate freely inside member 228. By virtue of clamp 210 the effective length of arm 200 and its angular relationship to sector 206 can be readily adjusted in order to enter respectively into the apparatus the radius of the header and the right or left offset of center of the branch pipe. Thus, pivot point 204 oscillates on an arc indicated at 245 (FIGURE 3) having a radius equal to the radius of the header pipe while the pivot point of clamp 210 is offset in the direction and in the amount the branch is offset from the header.

As best seen in FIGURE 3 the output of cage 103 is transmitted through collar 92 and sleeve 90 to a collar member 260 which is secured tightly to sleeve 90 by a pressed fit. Collar 260 slidably holds rods 264 and 265 which are fixedly secured at one end to a sleeve member 266 and at the other end to a plate 267. Within sleeve 266 are mounted flanged bearing members 268 and 270 (see FIGURE 4A) which are fixedly secured to torch bar 272 by pins 274 and 276 respectively so that sleeve 266 is freely rotatable with respect to bearing members 268 and 270 and torch bar 272 and so that sleeve 266 and bar 272 move together in the direction of the axis of bar 272.

Bar 272 is slidably mounted in support member 278 mounted on top of housing 26 and is fixedly secured to a torch holder 280 by a clamp indicated at 282. Torch holder 280 is slidably mounted on a pair of rails 284 and 286 which are secured to a plate 288 and at their other ends to a bracket 290 fixedly secured to housing 26. A conventional cutting torch indicated at 294 is secured to torch holder 280 in a conventional manner by a clamp 296. Since cutting torches are well known no further description of torch 294 is necessary.

Scales

As previously indicated generally scales $S_1$ through $S_4$ are employed by the operator for entering direct without computation all of the inputs necessary for cutting the end of a branch pipe to the desired contour for a predetermined intersection with a header pipe. Scale $S_1$ is calibrated so that the center of rod 74 will be a distance away from the center of shaft 36 (the center of rotation of disc 56) equal to the radius of the branch pipe. To facilitate the work of the operator the $S_1$ scale numbers are in inches of diameter of the branch pipe. Thus, if the diameter of the branch pipe is four inches, the operator will set pointer 78 to the numeral 4 on scale $S_1$ and this will position the center of rod 74 two inches away from the center of rotation of disc 56. The desired setting is achieved by loosening clamp 66 and swinging arm 59 to desired position and then retightening clamp 66.

Scale $S_2$ is calibrated in degrees with the 90° mark being opposite pointer 182 when the center line 154 of base plate 142 lies parallel to the axis of disc 56 and pipe 30. When the angle of intersection between the branch pipe and the header pipe has been determined, base plate 142 is positioned so that pointer 182 will be pointing at the degrees of intersection on scale $S_2$, clamp member 186 being loosened for the necessary rotation of base plate 142 and then tightened down to clamp the base plate 142 in position when the desired reading has been obtained. Thus if the angle $a$ in FIGURE 1 were 80° the plate 142 would be rotated until pointer 182 pointed to 80° and the clamp would then be set.

Scale $S_3$ is marked in inches of diameter of the header pipe, but since the length between pivot 204 and the center of bolt 212, i.e., the effective length of arm 200, is to be equal to the radius of the header pipe the scale is reduced in half, i.e., the graduation lines indicating 2, 4, 6 etc. inches are only 1″ apart. Thus the operator simply sets pointer 216 to the diameter of the header pipe to get the desired radius input.

It is desired that the distance between pivot point 204 of arm 200 and the center of clamp 210 be equal to the radius of the header pipe. However, since it is easier for the operator to deal in terms of the diameter, the scale $S_3$ while graduated in inches and increments thereof is actually double scale, that is to say it indicates two inches at the inch mark, four inches at the two inch mark, etc.

The amount of right or left offset of the branch pipe from the center of the header pipe in inches is set on scale $S_4$ employing clamp 210 and at the same time as setting scale $S_3$.

Scale $S_4$ could equally well be adjacent a vertical slot and would then read directly in inches. As shown it is arcuate and is simply calibrated in terms of the vertical movement or offset of the center of clamp 210 from the horizontal or zero offset positon. It will be noted that in the zero offset position, as shown in FIGURE 7, the center of arm 200 lies in the same horizontal plane as the axis of disc 56.

It will be appreciated that any increment of measurement desired may be employed on the scales.

Operation

It is believed that the operation of the above described embodiment is obvious from the description thereof. Scale $S_1$ is used to position rod 74 at a distance from the center of disc 56 equal to the radius of the branch pipe, thus, as rod 74 is rotated it traces the contour of the branch pipe. The vertical component of the motion of rod 74 is transferred by sleeve 90, collar 92, sliders 96 and 98, rails 100 and 102, sliders 108, 110, 112 and 114, plate 203 and pivot 204 to lever 200.

The effective length of lever 200 is set using scale $S_3$ to the radius of the header pipe. It will be seen that pivot point 204 will in effect trace the contour of the header pipe. Compensation for offset is taken care of by placing clamp member 240 at the desired elevation above or below the axis of disc 56 using scale $S_4$. By the same token base plate 142 is swung to simulate the angle of intersection employing scale $S_2$.

When set up and operated in this manner, the component of motion of lever 200 in the direction of the axis of disc 56 supplied torch 294 with the motion necessary to properly contour the branch pipe 22 which is being rotated at the same angular rate as disc 56. This component of motion of lever 200 is transferred to torch 294 through plate 203, sliders 108, 110, 112 and 114, rails 100 and 102, sliders 96 and 98, collar 92, sleeve 90, collar 260, rods 264 and 265, sleeve member 266, bearing member 268 and 270 and bar 272.

It will be noted, in the above operation, that base plate 142 may be rotated with respect to collar 92 by virtue of the vertical pivots between collar 92 and sliders 96 and 98. Further, rod 74 slides freely within sleeve 90. While the rotation of rod 74 causes the oscillation of sleeve 266 this motion is not transmitted to bar 272.

The above described embodiment is simply illustrative of the invention and is not intended to be limiting, it being obvious to reverse some of the parts and to make other embodiments.

What is claimed:

1. Apparatus for developing the end of a branch pipe for connection with a header pipe comprising:

rotatable arm means for tracing a circle having the radius of the branch pipe, a lever pivoted on an axis lying in a plane parallel to the axis of rotation of the rotatable means, means to swing in said plane the axis on which the lever is pivoted to position the said lever axis at an angle with respect to the axis of the rotatable means equal to the angle of intersection of the branch pipe and the header pipe, means to move the axis on which the lever is pivoted to position the said plane at a distance from the axis of the rotatable means equal to the distance of offset of the branch pipe from the center of the header pipe, means to transfer the component of motion of the rotatable means in the direction of movement of said lever to said lever at a point removed from the position where the lever is pivoted a distance equal to the radius of the header pipe to move said point on the lever with respect to said lever axis through an arc having the radius of the header pipe, rotatable pipe holding means for holding and rotating the branch pipe, means to rotate the first and second mentioned rotatable means at the same angular rate, cutting means mounted for movement parallel to the branch pipe axis and, means to transfer the component of the movement of the lever in the direction of the axis of the first mentioned rotatable means to the cutting means.

2. Apparatus for developing branch pipe connections comprising:

rotatable means, an arm mounted for rotation with the rotatable means, means to offset the arm from the axis of the rotatable means a distance equal to the radius of the branch pipe with axis of the arm parallel to the axis of the rotatable means, a base having a center line parallel to the axis of the rotatable means when the angle of intersection of the branch pipe and the intersected pipe is 90°, means mounting the base for adjustable rotation, a cross rail mounted on the base for movement in the direction of the center line, transverse the center line and towards and away from the base, a member fixedly secured to the base, a lever lying in a plane perpendicular to the base, pivotally connected to the rail, and pivotally connected to the fixed member at an adjustable distance from the base and at an adjustable predetermined distance from the pivotal connection to the rail, means slidably mounted on the cross rail and connected to said arm for sliding and relative rotation with respect thereto, rotatable means for holding and rotating the branch pipe, means to rotate the rotatable means, cutting means mounted adjacent the pipe and, means connected to the cutting means and the rail to translate the movement of the rail in the direction of the pipe axis to the torch.

References Cited

UNITED STATES PATENTS

| | | | |
|---|---|---|---|
| 2,974,415 | 3/1961 | Werner | 266—23 X |
| 2,647,319 | 8/1953 | Grubich | 266—23 X |
| 3,206,180 | 9/1965 | Grubich | 266—23 |

J. SPENCER OVERHOLSER, *Primary Examiner.*

R. D. BALDWIN, *Assistant Examiner.*

U.S. Cl. X.R.

148—9.6; 33—21